US011877307B2

(12) United States Patent
Abotabl et al.

(10) Patent No.: US 11,877,307 B2
(45) Date of Patent: Jan. 16, 2024

(54) SIGNALING OF NON-LINEARITIES FOR INTER-UE INTERFERENCE CANCELLATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US); Joseph Patrick Burke, San Diego, CA (US); Tingfang Ji, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/450,240

(22) Filed: Oct. 7, 2021

(65) Prior Publication Data
US 2023/0112468 A1 Apr. 13, 2023

(51) Int. Cl.
*H04W 72/541* (2023.01)
*H04B 1/7107* (2011.01)
*H04W 72/044* (2023.01)

(52) U.S. Cl.
CPC ........ *H04W 72/541* (2023.01); *H04B 1/7107* (2013.01); *H04W 72/0473* (2013.01)

(58) Field of Classification Search
None
See application file for complete search history.

(56) References Cited

U.S. PATENT DOCUMENTS

2013/0215811 A1* 8/2013 Takaoka ............ H04W 28/0268
370/311
2016/0044486 A1* 2/2016 Pais .................... H04W 72/082
370/252

(Continued)

FOREIGN PATENT DOCUMENTS

WO   WO-2020220344 A1 * 11/2020
WO   WO-2022073615 A1 *  4/2022

OTHER PUBLICATIONS

English translation of Wang (Year: 2022).*

*Primary Examiner* — Benjamin Lamont
(74) *Attorney, Agent, or Firm* — Norton Rose Fulbright LLP

(57) ABSTRACT

Systems, methods, and devices for wireless communication that support mechanisms signaling non-linearities to a victim user equipment (UE) for interference cancellation in a wireless communication system. A victim UE may experience interference from an uplink transmission by an aggressor UE to a base station. The victim UE may obtain a power amplifier model associated with the aggressor UE. The power amplifier may include a non-linearity model of a power amplifier of the aggressor UE causing the interference on the victim UE. The power amplifier model obtained by the victim UE may be dependent on various parameters, such as a transmit power used by the aggressor UE to transmit the uplink transmission causing the interference. Based on the aggressor UE transmit power, the victim UE may select parameters for power amplifier model and may estimate the interference caused by the uplink transmission for interference cancellation.

30 Claims, 9 Drawing Sheets

(56) References Cited

U.S. PATENT DOCUMENTS

2016/0218754 A1\* 7/2016 Shi .................... H04L 25/03821
2018/0102807 A1\* 4/2018 Chen ................... H04L 25/0328
2018/0159643 A1\* 6/2018 Huang ................. H04L 1/0003

\* cited by examiner

SIGNALING OF NON-LINEARITIES FOR INTER-UE INTERFERENCE CANCELLATION

TECHNICAL FIELD

Aspects of the present disclosure relate generally to wireless communication systems, and more particularly, to non-linearities model signaling for interference cancellation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes obtaining a power amplifier model associated with an aggressor UE transmitting an uplink transmission to a base station over an uplink. In aspects, the uplink transmission causes an interference signal to be received by the UE. The method further includes determining an estimate of a transmit power used by the aggressor UE to transmit the uplink transmission to the base station, and performing interference cancellation on the interference signal based, at least in part, on the power amplifier model associated with the aggressor UE and the transmit power used by the aggressor UE to transmit the uplink transmission.

In an additional aspect of the disclosure, a method of wireless communication performed by a UE includes transmitting an uplink transmission to a base station over an uplink using a transmit power. In aspects, the uplink transmission causes an interference signal to be received by a victim UE. The method further includes determining a power amplifier model associated with the UE, and transmitting an indication of the power amplifier model associated with the UE to the victim UE. In aspects, the victim UE is configured to perform interference cancellation on the interference signal based, at least in part, on the power amplifier model associated with the UE and the transmit power used by the UE to transmit the uplink transmission to the base station.

In an additional aspect of the disclosure, a method of wireless communication performed by a base station includes receiving an uplink transmission from an aggressor UE over an uplink at a transmit power. In aspects, the uplink transmission causes an interference signal to be received by a victim UE. The method further includes receiving an indication of a power amplifier model associated with the aggressor UE. In aspects, the victim UE is configured to perform interference cancellation on the interference signal based, at least in part, on the power amplifier model associated with the aggressor UE and the transmit power used by the aggressor UE to transmit the uplink transmission to the base station.

In an additional aspect of the disclosure, a UE includes at least one processor and a memory coupled to the at least one processor. The at least one processor stores processor-readable code that, when executed by the at least one processor, is configured to perform operations including obtaining a power amplifier model associated with an aggressor UE transmitting an uplink transmission to a base station over an uplink. In aspects, the uplink transmission causes an interference signal to be received by the UE. The operations further include determining an estimate of a transmit power used by the aggressor UE to transmit the uplink transmission to the base station, and performing interference cancellation on the interference signal based, at least in part, on the power amplifier model associated with the aggressor UE and the transmit power used by the aggressor UE to transmit the uplink transmission.

In an additional aspect of the disclosure, a UE includes at least one processor and a memory coupled to the at least one processor. The at least one processor stores processor-readable code that, when executed by the at least one processor, is configured to perform operations including transmitting an uplink transmission to a base station over an uplink using a transmit power. In aspects, the uplink transmission causes an interference signal to be received by a victim UE. The operations further include determining a power amplifier model associated with the UE, and transmitting an indication of the power amplifier model associated with the UE to the victim UE. In aspects, the victim UE is configured to perform interference cancellation on the interference signal based, at least in part, on the power amplifier model associated with the UE and the transmit power used by the UE to transmit the uplink transmission to the base station.

In an additional aspect of the disclosure, a base station includes at least one processor and a memory coupled to the at least one processor. The at least one processor stores processor-readable code that, when executed by the at least one processor, is configured to perform operations including receiving an uplink transmission from an aggressor UE over an uplink at a transmit power. In aspects, the uplink transmission causes an interference signal to be received by a victim UE. The operations further include receiving an indication of a power amplifier model associated with the aggressor UE. In aspects, the victim UE is configured to perform interference cancellation on the interference signal based, at least in part, on the power amplifier model associated with the aggressor UE and the transmit power used by the aggressor UE to transmit the uplink transmission to the base station.

In an additional aspect of the disclosure, a non-transitory computer-readable medium stores instructions that, when executed by a processor, cause the processor to perform operations. The operations include obtaining, by a UE, a power amplifier model associated with an aggressor UE transmitting an uplink transmission to a base station over an uplink. In aspects, the uplink transmission causes an interference signal to be received by the UE. The operations further include determining an estimate of a transmit power used by the aggressor UE to transmit the uplink transmission to the base station, and performing interference cancellation on the interference signal based, at least in part, on the power amplifier model associated with the aggressor UE and the transmit power used by the aggressor UE to transmit the uplink transmission.

In an additional aspect of the disclosure, a non-transitory computer-readable medium stores instructions that, when executed by a processor, cause the processor to perform operations. The operations include transmitting, by a UE, an uplink transmission to a base station over an uplink using a transmit power. In aspects, the uplink transmission causes an interference signal to be received by a victim UE. The operations further include determining a power amplifier model associated with the UE, and transmitting an indication of the power amplifier model associated with the UE to the victim UE. In aspects, the victim UE is configured to perform interference cancellation on the interference signal based, at least in part, on the power amplifier model associated with the UE and the transmit power used by the UE to transmit the uplink transmission to the base station.

In an additional aspect of the disclosure, a non-transitory computer-readable medium stores instructions that, when executed by a processor, cause the processor to perform operations. The operations include receiving, by a base station, an uplink transmission from an aggressor UE over an uplink at a transmit power. In aspects, the uplink transmission causes an interference signal to be received by a victim UE. The operations further include receiving an indication of a power amplifier model associated with the aggressor UE. In aspects, the victim UE is configured to perform interference cancellation on the interference signal based, at least in part, on the power amplifier model associated with the aggressor UE and the transmit power used by the aggressor UE to transmit the uplink transmission to the base station.

In an additional aspect of the disclosure, an apparatus includes means for obtaining, by a UE, a power amplifier model associated with an aggressor UE transmitting an uplink transmission to a base station over an uplink. In aspects, the uplink transmission causes an interference signal to be received by the UE. The method further includes determining an estimate of a transmit power used by the aggressor UE to transmit the uplink transmission to the base station, and performing interference cancellation on the interference signal based, at least in part, on the power amplifier model associated with the aggressor UE and the transmit power used by the aggressor UE to transmit the uplink transmission.

In an additional aspect of the disclosure, an apparatus includes means for transmitting, by a UE, an uplink transmission to a base station over an uplink using a transmit power. In aspects, the uplink transmission causes an interference signal to be received by a victim UE. The apparatus further includes means for determining a power amplifier model associated with the UE, and means for transmitting an indication of the power amplifier model associated with the UE to the victim UE. In aspects, the victim UE is configured to perform interference cancellation on the interference signal based, at least in part, on the power amplifier model associated with the UE and the transmit power used by the UE to transmit the uplink transmission to the base station.

In an additional aspect of the disclosure, an apparatus includes means for receiving, by a base station, an uplink transmission from an aggressor UE over an uplink at a transmit power. In aspects, the uplink transmission causes an interference signal to be received by a victim UE. The apparatus further includes means for receiving an indication of a power amplifier model associated with the aggressor UE. In aspects, the victim UE is configured to perform interference cancellation on the interference signal based, at least in part, on the power amplifier model associated with the aggressor UE and the transmit power used by the aggressor UE to transmit the uplink transmission to the base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
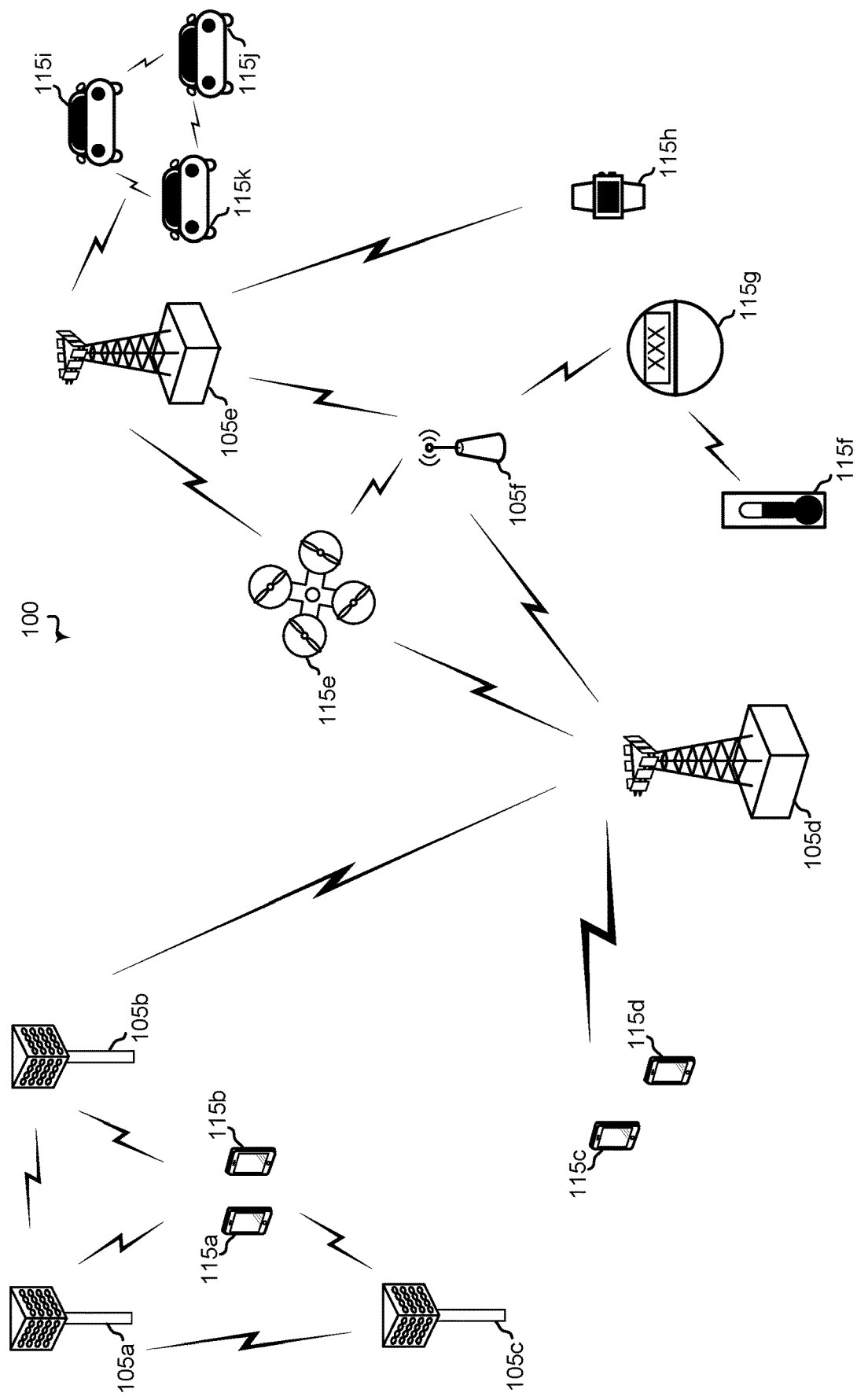
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, MHz, and the like bandwidth. For other various outdoor and small cell coverage deployments of TDD greater than 3 GHz, subcarrier spacing may occur with 30 kHz over MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
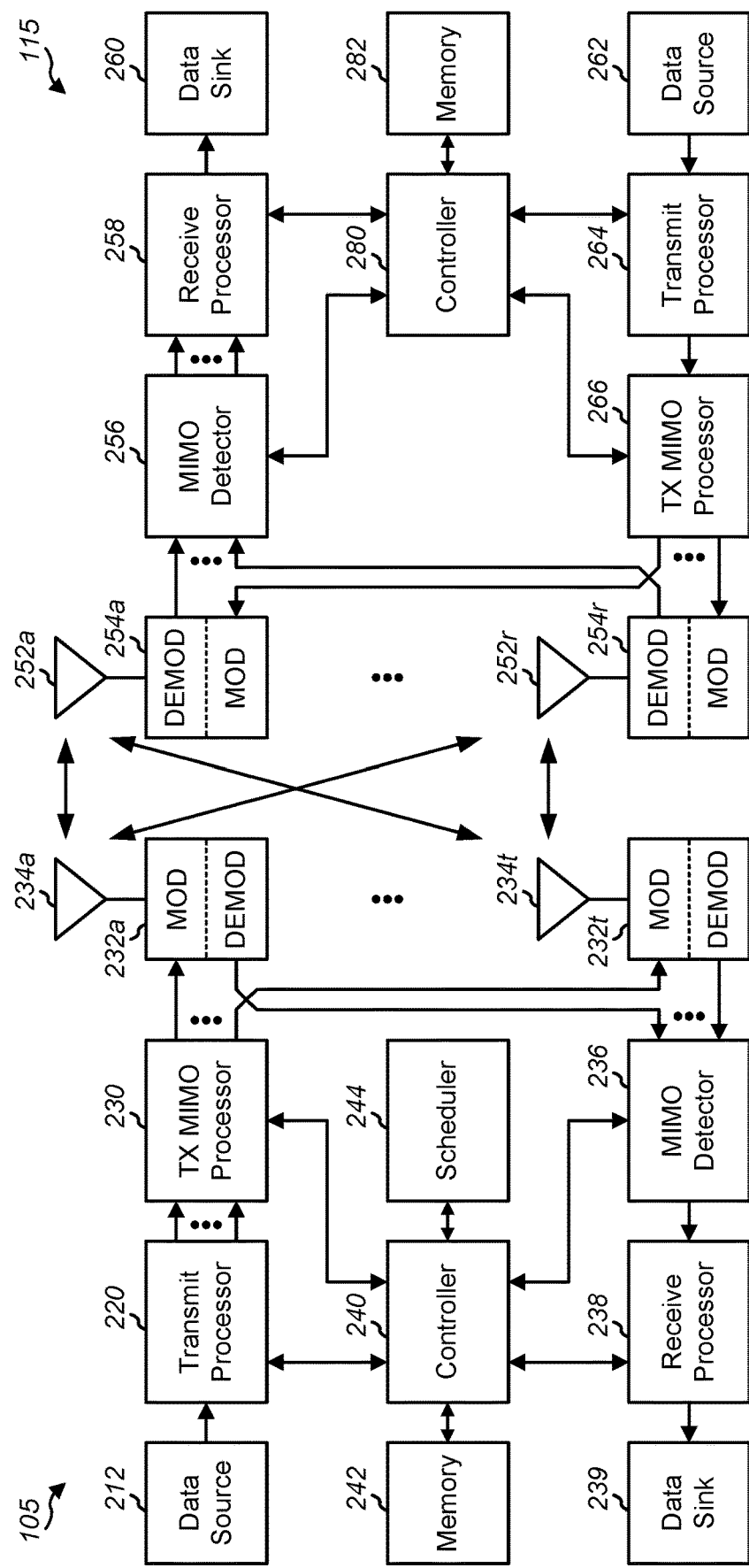
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5-7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Some current wireless communication systems may be configured to implement full-duplex communications. In full-duplex communication, a node may transmit and receive concurrently over a same resources (e.g., over the same frequencies at the same time). For example, a UE may transmit over the uplink and receive over the downlink concurrently. There are primarily two types of full-duplex communications, in-band full-duplex and subband full-duplex. With in-band full-duplex, the uplink and downlink may overlap in the time domain and in the frequency domain. In subband full-duplex, the uplink and the downlink may overlap in the time domain, but in the frequency domain, the frequencies of the downlink and the uplink may be separated from each other by a guard band. Nonetheless, in either implementation of full-duplex communication, and indeed in any implementation of full-duplex communication, the problem of self-interference is present. Self-interference may include the interference caused by an uplink transmission from the UE on a downlink reception received by the UE.

Figure 3:
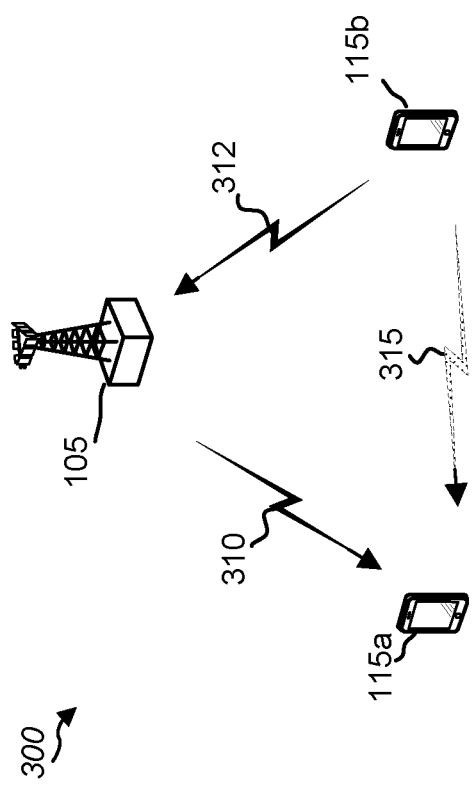
FIG. 3 is a block diagram illustrating an example of inter-UE interference in a wireless communication system.

Interference in a wireless communication system, however, is not limited to self-interference in full-duplex systems. Inter-UE interference may also be a problem in current wireless communication systems. Inter-UE interference may refer to interference on a downlink transmission received by a victim UE caused by an uplink transmission transmitted by an aggressor UE. FIG. 3 is a block diagram illustrating an example of inter-UE interference in a wireless communication system. In particular, as shown, aggressor UE 115*b* and victim UE 115*a* may be in communication with base station 105. In this example, aggressor UE 115*b* may transmit uplink transmission 312 to base station 105 over the uplink. In this example, victim UE 115*a* may receive downlink transmission 310 from base station 105 concurrently with, or during a same time period as, the transmission of uplink transmission 312 to base station 105. The transmission of uplink transmission 312 from aggressor UE 115*b* to base station 105 may interfere with the reception of downlink transmission 310 by victim UE 115*a*. For example, uplink transmission 312 from aggressor UE 115*b* may cause inter-UE interference 315 against victim UE 115*a*, and victim UE 115*a* may have problems properly decoding downlink transmission 310.

Currently, there are interference cancellation techniques that may be used to address self-interference. For example, in a full-duplex implementation, a node may perform self-interference cancellation to minimize or eliminate the interference caused by the concurrent transmission and reception over the same frequencies. Self-interference cancellation in a full-duplex node may be challenging because of non-linearities imposed by power amplifiers and/or other sources in the transmission channel or on the receiver side of the signal. In these cases, a signal to be transmitted may be distorted by the non-linearities present in the communication channels. However, as the transmitter and receiver reside in the same node, the node may be able to use information related to these non-linearities to perform self-interference cancellation. In order to perform self-interference cancellation, a node may estimate a model of the non-linearities distorting the signal to be transmitted. Based on the estimated non-linearities model, and based on a clean baseband signal of the signal to be transmitted, the node may estimate the self-interference generated by the transmission of the signal. The node may then subtract the estimated self-interference from the received signal.

However, the process for interference cancellation in inter-UE interference scenarios may not be as straightforward. For example, in inter-UE interference, most of the non-linearities exist in the power amplifier of the transmitting UE, which in the example illustrated in FIG. 3, is aggressor UE 115*b*, and are not known to victim UE 115*a*. In these cases, neither aggressor UE 115*b* nor victim UE 115*a* may know the distortion that is caused to the transmitted signal (e.g., the signal causing inter-UE interference 315) by the non-linearities of the power amplifier of aggressor UE 115*b*. In this manner, even a reference signal transmission, sent to victim UE 115*a*, modeling the signal to be transmitted by aggressor UE 115*b* may not be sufficient to cancel inter-UE interference 315, as there are currently no mechanisms for victim UE 115*a* to determine the distortion caused by the power amplifier of aggressor UE 115*b* on uplink transmission 312 in order to determine inter-UE interference 315.

Various aspects of the present disclosure are directed to systems and methods that support mechanisms for signaling non-linearities to a victim UE for interference cancellation in a wireless communication system. In aspects, a victim UE may experience interference from an uplink transmission transmitted by an aggressor UE to a base station. The victim UE may obtain a power amplifier model associated with the aggressor UE. In aspects, the power amplifier may include a model of non-linearities of the power amplifier of the aggressor UE used to transmit the uplink transmission causing the interference on the victim UE. In some aspects, the victim UE may obtain the power amplifier model by estimating the power amplifier model based on an indication of a reference signal transmitted by the aggressor UE. The reference signal may be an uplink reference signal (UL-RS)

transmitted from the aggressor UE to the base station, or may be a sidelink reference signal transmitted from the aggressor UE to the victim UE. In some aspects, the power amplifier may be signaled to the victim UE by the aggressor UE (e.g., may be signaled via the sidelink, or may be signaled via the base station). In aspects, the power amplifier model obtained by the victim UE may be dependent on various parameters. For example, the power amplifier model may depend on a transmit power used by the aggressor UE to transmit the uplink transmission causing the interference. In these aspects, the victim UE may obtain an indication of the transmit power used by the aggressor UE, and may select parameters to be used with the power amplifier model in order to estimate the interference caused by the uplink transmission based on the estimated transmit power. In this manner, the power amplifier model and the transmit power may be used to estimate the interference caused by the uplink transmission.

As used herein, an aggressor UE may refer to a transmitting UE whose transmission may cause inter-UE interference to a victim UE. A victim UE may refer to a UE suffering interference from the aggressor UE. It is noted that although the techniques discussed herein are described with respect to an aggressor UE transmitting a transmission to a base station, this is for illustrative purposes, and in some cases, the aggressor UE may transmit a transmission to another UE over a sidelink, and this sidelink transmission may cause interference on the victim UE. In that case, the techniques described herein for inter-UE interference cancellation may be used to cancel the interference caused by the sidelink transmissions.

Figure 4:
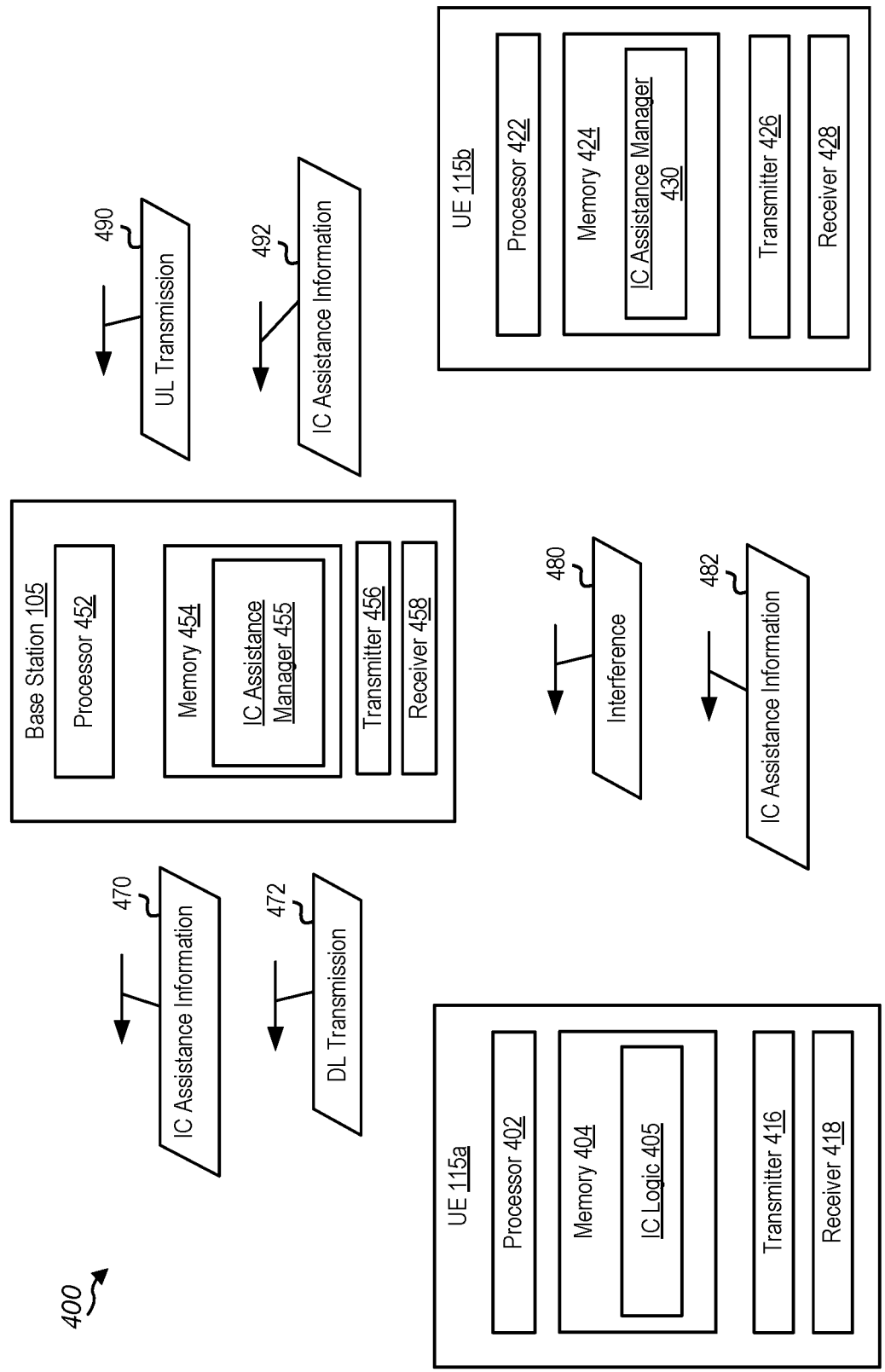
FIG. 4 is a block diagram illustrating an example wireless communication system that supports mechanisms for signaling non-linearities to a victim UE for interference cancellation in a wireless communication system according to one or more aspects.

FIG. 4 is a block diagram of an example wireless communications system 400 that supports mechanisms for signaling non-linearities to a victim UE for interference cancellation in a wireless communication system according to one or more aspects. In some examples, wireless communications system 400 may implement aspects of wireless network 100. Wireless communications system 400 includes UE 115a, UE 115b, and base station 105. In aspects, UE 115a and UE 115b may each be in communication with base station 105, and in some aspects may be configured to communicate with each other over a sidelink. In the discussion that follows, UE 115a may be described as a victim UE and UE 115b may be described as an aggressor UE, and in this context UE 115b may transmit uplink transmissions (e.g., uplink transmission 490) to base station 105, and UE 115a may receive downlink transmissions (e.g., downlink transmission 472) from base station 105. Also in this context, the uplink transmissions from aggressor UE 115b may cause inter-UE interference 480 to victim 115a. However, this description of UE 115a as a victim UE and UE 115b as an aggressor UE, as well as the description of system 400 as including two UEs and one base station, is merely for illustrative purposes and not intended to be limiting in any way. As such, wireless communications system 400 may generally include multiple UEs 115, and may include more than one base station 105.

UE 115a may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"). Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store interference cancellation logic 405. In aspects, interference cancellation logic 405 may be configured to perform operations for obtaining a power amplifier model associated with a transmitter of aggressor UE 115b used to transmit an uplink transmission to base station 105, to obtain a transmit power associated with the uplink transmission, and to perform interference cancellation, based on the power amplifier model and the transmit power, on interference caused by the uplink transmission on victim UE 115a in accordance with aspects of the present disclosure.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

UE 115b also may include a variety of components (such as structural, hardware components) used for carrying out one or more functions described herein. For example, these components may include one or more processors 422 (hereinafter referred to collectively as "processor 422"), one or more memory devices 424 (hereinafter referred to collectively as "memory 424"), one or more transmitters 426 (hereinafter referred to collectively as "transmitter 426"), and one or more receivers 428 (hereinafter referred to collectively as "receiver 428"). Processor 422 may be configured to execute instructions stored in memory 424 to perform the operations described herein. In some implementations, processor 422 includes or corresponds to one or more of receive processor 258, transmit processor 264, and controller 280, and memory 424 includes or corresponds to memory 282.

Memory 424 includes or is configured to store interference cancellation assistance manager 430. In aspects, interference cancellation assistance manager 405 may be configured to perform operations to assist victim UE 115a in performing interference cancellation on interference caused by uplink transmissions from aggressor UE 115b in accordance with aspects of the present disclosure. In aspects, the operations to assist victim UE 115a in performing interference cancellation may include extracting a power amplifier model associated with a transmitter of aggressor UE 115b used to transmit the uplink transmission to base station 105, to signal the power amplifier model to victim UE 115a (e.g., via a sidelink transmission or via base station 105), and/or signaling a transmit power used to transmit the uplink transmission to base station 105 (e.g., via a sidelink transmission or via base station 105).

Transmitter 426 is configured to transmit reference signals, control information and data to one or more other devices, and receiver 428 is configured to receive references signals, synchronization signals, control information and data from one or more other devices. For example, transmitter 426 may transmit signaling, control information and data to, and receiver 428 may receive signaling, control information and data from, base station 105. In some implementations, transmitter 426 and receiver 428 may be integrated in one or more transceivers. Additionally or alternatively, transmitter 426 or receiver 428 may include or correspond to one or more components of UE 115 described with reference to FIG. 2.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store interference cancellation assistance manager 455. In aspects, interference cancellation assistance manager 405 may be configured to perform operations to assist victim UE 115a in performing interference cancellation on interference caused by uplink transmissions from aggressor UE 115b in accordance with aspects of the present disclosure. In aspects, the operations to assist victim UE 115a in performing interference cancellation may include relaying a power amplifier model associated with a transmitter of aggressor UE 115b used to transmit the uplink transmission from aggressor UE 115b to victim UE 115a, and/or t signaling a transmit power used to transmit the uplink transmission from aggressor UE 115b to victim UE 115a.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communication system 400, aggressor UE 115b transmits uplink transmission 490 to base station 105. In aspects, uplink transmission 490 may be transmitted at a transmit power, and may cause interference to neighboring victim UE 115a. For example, victim UE 115a may receive downlink transmission 472 from base station 105. Victim UE 115a may receive downlink transmission 472 from base station 105 concurrently, or at least overlapping, with the transmission of uplink transmission 490 from aggressor UE 115b to base station 105. The concurrent transmission of uplink transmission 490 from aggressor UE 115b to base station 105 may cause victim UE 115a to suffer inter-UE interference from aggressor UE 115b when receiving downlink transmission 472. For example, victim UE 115a may experience or suffer inter-UE interference 480. Inter-UE interference 480 may cause victim UE 115a to experience problems with receiving and/or decoding downlink transmission 472.

In aspects, victim UE 115a may determine to perform interference cancellation in order to cancel the interference caused by inter-UE interference 480. In general terms, victim UE 115a may perform interference cancellation of, or on, inter-UE interference 480 by obtaining a power amplifier model associated with a transmitter of aggressor UE 115b used to transmit uplink transmission 490, to obtain the transmit power used by aggressor UE 115b used to transmit uplink transmission 490, to select parameters for the power amplifier model based on the transmit power, and to perform interference cancellation of inter-UE interference 480 based on the power amplifier model and the selected parameters. This process is described in more detail in the following.

In aspects, victim UE 115a may obtain the power amplifier model associated with the transmitter of aggressor UE 115b used to transmit uplink transmission 490 by extracting a non-linearity model from a reference signal transmitted by aggressor UE 115b. In general terms, victim UE may obtains information on the reference signal transmitted by aggressor UE 115b, and may compare what is received as downlink transmission 472 with the reference signal in order to extract the non-linearity based on the reference signal and the received downlink transmission 472. In these aspects, victim UE 115a may be signaled an indication of a configuration of the reference signal (e.g., location of the reference signal in time and frequency, etc.), victim UE 115a may listen for the reference signal, and victim UE 115a may extract a non-linearity model based, at least in part, on the reference signal. It is noted that a power amplifier model may be represented by a non-linearity model. In this manner, the power amplifier model associated with aggressor UE 115b may represent a model of the non-linearities in the transmission path that is used by aggressor UE 115b to transmit uplink transmission 490. As noted above, these non-linearities may cause a distortion of the signal being transmitted in uplink transmission 490.

In some aspects, extracting a non-linearity model associated with a transmission path may include estimating a memory polynomial (MP) model, and expressing the non-linearity model in terms of the coefficients of the MP model, where there is one coefficient per kernel. In some aspects, the non-linearity model may be approximated with a polynomial estimated based on the non-linearity curve of the power amplifier. In these aspects, the coefficients of the polynomial may fully describe the non-linearity curve.

As noted above, victim UE 115a may extract the non-linearity model from a reference signal transmitted by aggressor UE 115b. In aspects, the reference signal may be an uplink reference signal (UL-RS) transmitted from aggressor UE 115b to base station 105. The UL-RS may be any type of UL-RS that may be transmitted to a base station (e.g., a demodulation reference signal (DMRS), a sounding reference signal (SRS), etc.).

In aspects, information (e.g., configuration information) about the UL-RS may be indicated to victim UE 115a so that victim UE 115a may monitor and/or listen to the UL-RS in order to extract the non-linearity model associated with the power amplifier of the transmitter used to transmit uplink transmission 490 from aggressor UE 115b to base station 105, as described herein. In some aspects, the indication of the configuration information of the UL-RS may be provided by base station 105 to victim UE 115a using dynamic signaling. For example, base station 105 may indicate the configuration information of the UL-RS to victim UE 115a in interference cancellation (IC) assistance information message 470 transmitted from base station 105 to victim UE 115a.

In some aspects, IC assistance information message 470 may include a dynamic message. For example, the indication of the configuration information of the UL-RS may be transmitted as a new downlink control information (DCI) message format. In this new DCI message format transmitted to victim UE 115a, base station 105 may indicate to victim UE 115a information about the UL-RS transmitted by aggressor UE 115a to base station 105. The configuration information about the UL-RS may include various information such as sequence information including time and frequency information, a type of UL-RS (e.g., DMRS, SRS, etc.), etc.

In aspects, IC assistance information message 470 may include a radio resource control (RRC) configuration message. In aspects, the indication of the configuration information of the UL-RS may be provided by base station 105 to victim UE 115a using the RRC message in IC assistance information message 470. In these aspects, base station 105 may transmit an RRC message to victim UE 115a including the configuration information of the UL-RS transmitted by aggressor UE 115b to base station 105. These aspects directed to RRC signaling may be particularly useful in scenarios where victim UE 115a and aggressor UE 115b may be static.

In aspects, the indication of the configuration information of the UL-RS may be provided by aggressor UE 115b to victim UE 115a in IC assistance information message 482. For example, aggressor UE may transmit IC assistance information message 482 including the configuration information of the UL-RS to victim UE 115a over a sidelink between victim UE 115a and aggressor UE 115b. In some aspects, the sidelink IC assistance information message 482 may not include the UL-RS, but may include configuration information about the UL-RS to assist victim UE 115a in detecting the UL-RS.

In aspects, the reference signal may be a sidelink reference signal transmitted from aggressor UE 115b to victim UE 115a over a sidelink. For example, aggressor UE 115b may transmit the sidelink reference signal to victim UE 115b over the sidelink between victim UE 115a and aggressor UE 115b. Victim UE 115a may receive the sidelink reference signal, and may extract a non-linearity model based, at least in part, on the sidelink reference signal.

As noted above, the power amplifier model of the transmitter of aggressor UE 115b used to transmit uplink transmission 490 to base station 105 may be expressed in terms of coefficients of an MP model with a coefficient per kernel, and/or may be defined in terms of coefficients of a polynomial approximating the non-linearity curve of the power amplifier. In some aspects, aggressor UE 115b may be configured to estimate the power amplifier model of its transmitter. For example, aggressor UE 115b may be configured to estimate the power amplifier model based on uplink transmission 490, using current techniques for estimating a non-linearity model of a power amplifier used to transmit a signal. In aspects, the power amplifier model estimated by aggressor UE 115b may be provided to victim UE 115a. In aspects, as noted above, the power amplifier model may be defined in terms of coefficients of the polynomial.

In aspects, the coefficients of the power amplifier model provided to victim UE 115a may correspond to, or may be defined by, a particular transmit power of aggressor UE 115b. For example, in extracting the power amplifier model, aggressor UE 115a may estimate the power amplifier model coefficients at a particular transmit power of aggressor UE 115b. At a different transmit power, the power amplifier model coefficients may be different. As such, in aspects, when the power amplifier model is indicated to victim UE 115a, the coefficients of the power amplifier model may correspond to a particular transmit power of aggressor UE 115b. In some aspects, the power amplifier model may be provided to victim UE 115a using a plurality of sets of model coefficients, wherein each set of the plurality of sets may correspond to a different transmit power of aggressor UE 115b. In some aspects, victim UE 115a may maintain a table of different sets of power amplifier model coefficients (e.g., coefficients defining a model), where each set of power amplifier model coefficients may correspond to a different transmit power of aggressor UE 115b. In this manner, and as discussed below, victim UE 115a may, upon determining a transmit power used by aggressor UE 115b to transmit an uplink signal, select a set of coefficients for the power amplifier model corresponding to the transmit power, and may perform interference cancellation using those coefficients for the power amplifier model.

In aspects, the power amplifier model estimated by aggressor UE 115b may be provided to victim UE 115a via base station 105. For example, aggressor UE 115a may provide the estimated power amplifier model to base station 105 (e.g., in IC assistance information message 492). Base station 105 may then relay the power amplifier model to victim UE 115a (e.g., in IC assistance information message 470). In alternative or additional aspects, the power amplifier model estimated by aggressor UE 115b may be provided to victim UE 115a in a sidelink message (e.g., IC assistance information message 482) from aggressor UE 115b to victim UE 115a.

During operation of wireless communication system 400, victim UE 115a determines an estimate of a transmit power used by aggressor UE 115b to transmit uplink transmission 490 to base station 105. Victim UE 115a may determine a set of coefficients for the power amplifier model to be used to cancel interference caused by uplink transmission 490 based on the estimated transmit power.

In aspects, victim UE 115a may determine an estimate of the transmit power used by aggressor UE 115b to transmit uplink transmission 490 to base station 105 based on an indication of the transmit power used by aggressor UE 115b received from base station 105. The indication of the transmit power may be received from base station 105 in a DCI message, am RRC message, and/or a MAC-CE. In alternative or additional aspects, victim UE 115a may determine an estimate of the transmit power used by aggressor UE 115b to transmit uplink transmission 490 to base station 105 based on an indication of the transmit power used by aggressor UE 115b received from aggressor UE 115b over a sidelink. In still other alternative or additional aspects, victim UE 115a may determine an estimate of the transmit power used by aggressor UE 115b to transmit uplink transmission 490 to base station 105 based on an estimation of the transmit power performed by victim UE 115a. For example, victim UE 115a may estimate the transmit power of aggressor UE 115b by performing energy sensing based on a pathloss, and other measurements.

During operation of wireless communication system 400, victim UE 115a performs interference cancellation on the interference caused by uplink transmission 490 based, at least in part, on the power amplifier model associated with the transmitter of aggressor UE 115b and the estimate of the transmit power used by aggressor UE 115b to transmit uplink transmission 490.

In some aspects, as described above, victim UE 115a may maintain a table of different sets of power amplifier model coefficients (e.g., coefficients defining a model), where each set of power amplifier model coefficients may correspond to a different transmit power of aggressor UE 115b. In these aspects, victim UE 115a may, upon determining a transmit power used by aggressor UE 115b to transmit an uplink signal, select a set of coefficients for the power amplifier model corresponding to the transmit power, and may perform interference cancellation using those coefficients for the power amplifier model.

Figure 5:
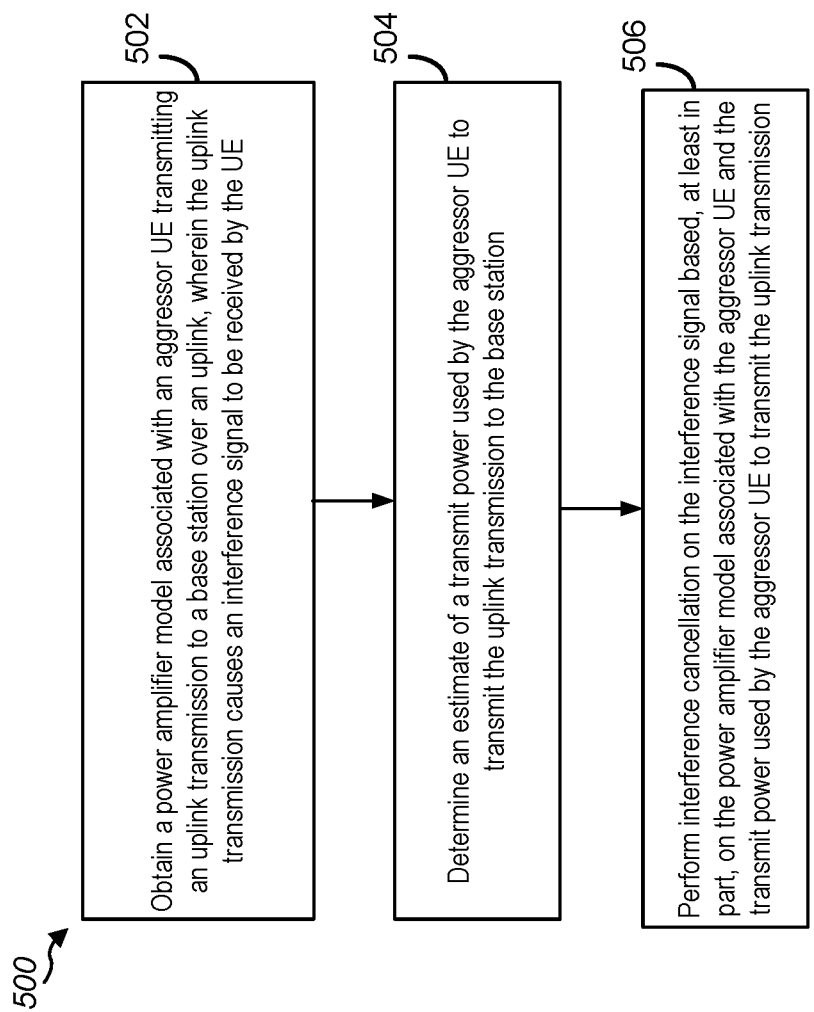
FIG. 5 is a flow diagram illustrating an example process that supports mechanisms for signaling non-linearities to a victim UE for interference cancellation in a wireless communication system according to one or more aspects.
Figure 8:
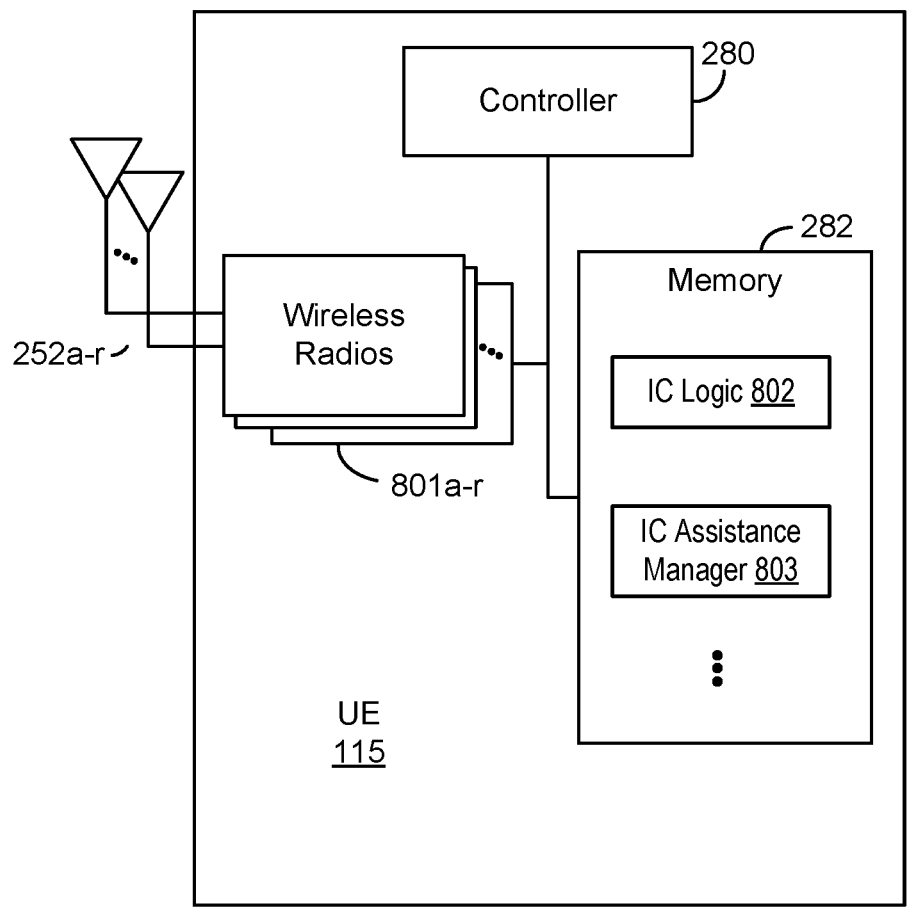
FIG. 8 is a block diagram of an example UE that supports mechanisms for signaling non-linearities to a victim UE for interference cancellation in a wireless communication system according to one or more aspects.

FIG. 5 is a flow diagram illustrating an example process 500 that supports mechanisms for signaling non-linearities to a victim UE for interference cancellation in a wireless communication system according to one or more aspects. Operations of process 500 may be performed by a UE, such as victim UE 115a described above with reference to FIGS. 1-4, or described with reference to FIG. 8. For example, example operations (also referred to as "blocks") of process 500 may enable UE 115 to support signaling non-linearities to a victim UE for interference cancellation. FIG. 8 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r includes various components and hardware, as illustrated in FIG. 2, including modulator/demodulators 254a-r, MIMO detector 256, receive processor 258, transmit processor 264, and TX MIMO processor 266.

At block 502 of process 500, a UE (e.g., UE 115 and/or victim UE 115a) obtains a power amplifier model associated with an aggressor UE (e.g., aggressor UE 115b) transmitting an uplink transmission to a base station (e.g., base station 105) over an uplink. In aspects, the uplink transmission may cause an interference signal to be received by victim UE 115. In order to implement the functionality for such operations, UE 115, under control of controller/processor 280, executes IC logic 802, stored in memory 282. The functionality implemented through the execution environment of IC logic 802 allows for UE 115 to perform operations for obtaining a power amplifier model associated with an aggressor UE transmitting an uplink transmission to a base station over an uplink. In aspects, UE 115 may obtain a power amplifier model associated with an aggressor UE transmitting an uplink transmission to a base station over an uplink according to operations and functionality as described above with reference to victim UE 115a and as illustrated in FIGS. 3 and 4.

At block 504 of process 500, UE 115 determines an estimate of a transmit power used by the aggressor UE to transmit the uplink transmission to base station 105. In order to implement the functionality for such operations, UE 115, under control of controller/processor 280, executes IC logic 802, stored in memory 282. The functionality implemented through the execution environment of IC logic 802 allows for UE 115 to perform operations for determining an estimate of a transmit power used by the aggressor UE to transmit the uplink transmission to base station 105. In aspects, UE 115 may determine an estimate of a transmit power used by the aggressor UE to transmit the uplink transmission to base station 105 according to operations and functionality as described above with reference to victim UE 115a and as illustrated in FIGS. 3 and 4.

At block 506 of process 500, UE 115 performs interference cancellation on the interference signal based, at least in part, on the power amplifier model associated with the aggressor UE and the transmit power used by the aggressor UE to transmit the uplink transmission. In order to implement the functionality for such operations, UE 115, under control of controller/processor 280, executes IC logic 802, stored in memory 282. The functionality implemented through the execution environment of IC logic 802 allows for UE 115 to perform operations for performing interference cancellation on the interference signal based, at least in part, on the power amplifier model associated with the aggressor UE and the transmit power used by the aggressor UE to transmit the uplink transmission. In aspects, UE 115 may perform interference cancellation on the interference signal based, at least in part, on the power amplifier model associated with the aggressor UE and the transmit power used by the aggressor UE to transmit the uplink transmission according to operations and functionality as described above with reference to victim UE 115a and as illustrated in FIGS. 3 and 4.

Figure 6:
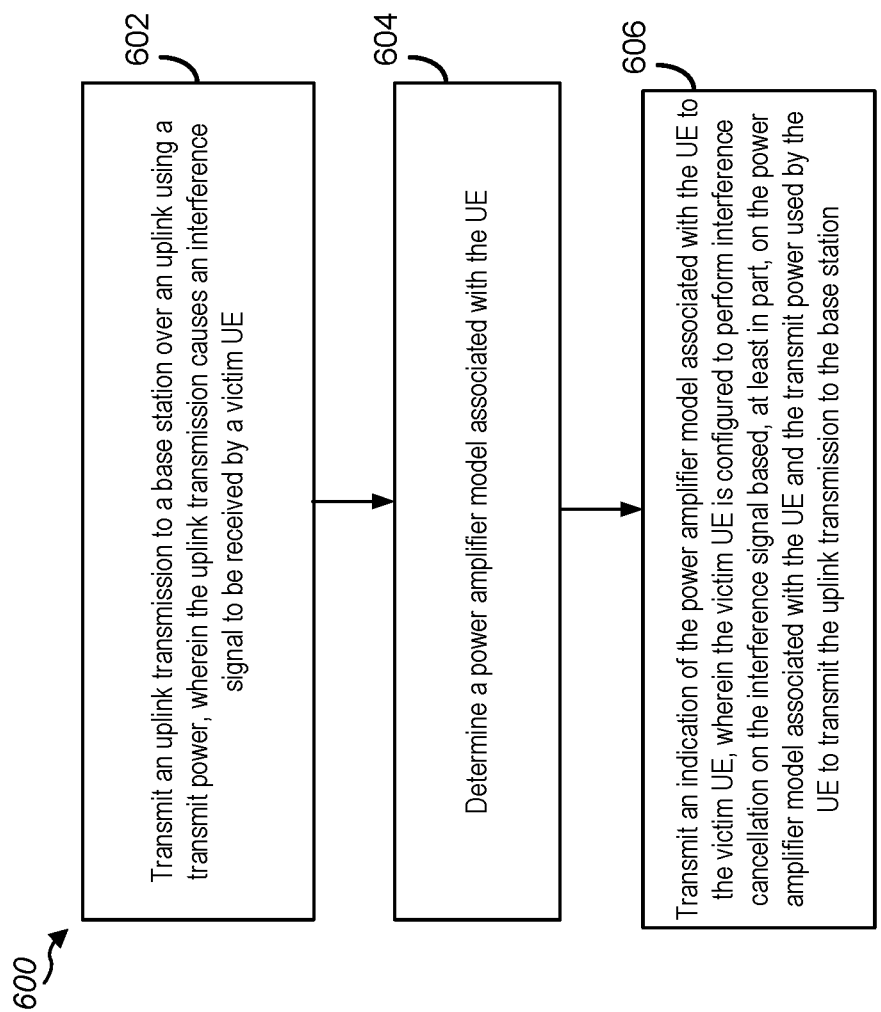
FIG. 6 is a flow diagram illustrating another example process that supports mechanisms for signaling non-linearities to a victim UE for interference cancellation in a wireless communication system according to one or more aspects.

FIG. 6 is a flow diagram illustrating an example process 600 that provides mechanisms for signaling non-linearities to a victim UE for interference cancellation in a wireless communication system according to one or more aspects. Operations of process 600 may be performed by a UE, such as aggressor UE 115b described above with reference to FIGS. 1-4, or described with reference to FIG. 8. For example, example operations (also referred to as "blocks") of process 500 may enable UE 115 to support signaling non-linearities to a victim UE for interference cancellation.

At block 602 of process 600, a UE (e.g., UE 115 and/or aggressor UE 115b) transmits an uplink transmission to a base station (e.g., base station 105) over an uplink using a transmit power. In aspects, the uplink transmission causes an interference signal to be received by a victim UE (e.g., victim UE 115a). In order to implement the functionality for such operations, UE 115, under control of controller/processor 280, may transmit the uplink transmission to base station 105 over an uplink using a transmit power via wireless radios 801a-r and antennas 252a-r. In aspects, UE 115 may transmit the uplink transmission to base station 105 over an uplink using a transmit power according to operations and functionality as described above with reference to aggressor UE 115b and as illustrated in FIGS. 3 and 4.

At block 604 of process 600, UE 115 determines a power amplifier model associated with the UE. In order to implement the functionality for such operations, UE 115, under control of controller/processor 280, executes IC assistance manager 803, stored in memory 282. The functionality implemented through the execution environment of IC assistance manager 803 allows for UE 115 to perform operations for determining a power amplifier model associated with the UE. In aspects, UE 115 may determine a power amplifier model associated with the UE according to operations and functionality as described above with reference to aggressor UE 115b and as illustrated in FIGS. 3 and 4.

At block 606 of process 600, UE 115 transmits an indication of the power amplifier model associated with the UE to the victim UE (e.g., victim UE 115a). In aspects, the victim UE is configured to perform interference cancellation on the interference signal based, at least in part, on the power amplifier model associated with the UE and the transmit power used by the UE to transmit the uplink transmission to the base station. In order to implement the functionality for such operations, UE 115, under control of controller/processor 280, may transmit an indication of the power amplifier model associated with the UE to the victim UE via wireless radios 801a-r and antennas 252a-r. In aspects, UE 115 may transmit an indication of the power amplifier model associated with the UE to the victim UE according to operations and functionality as described above with reference to aggressor UE 115b and as illustrated in FIGS. 3 and 4.

Figure 7:
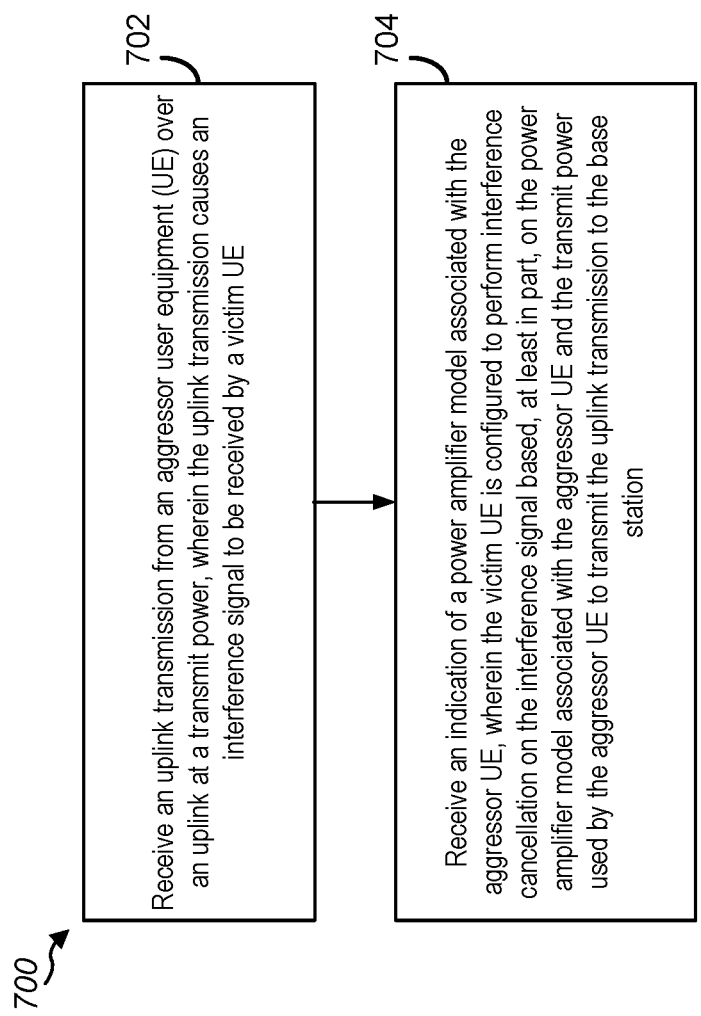
FIG. 7 is a flow diagram illustrating another example process that supports mechanisms for signaling non-linearities to a victim UE for interference cancellation in a wireless communication system according to one or more aspects.
Figure 9:
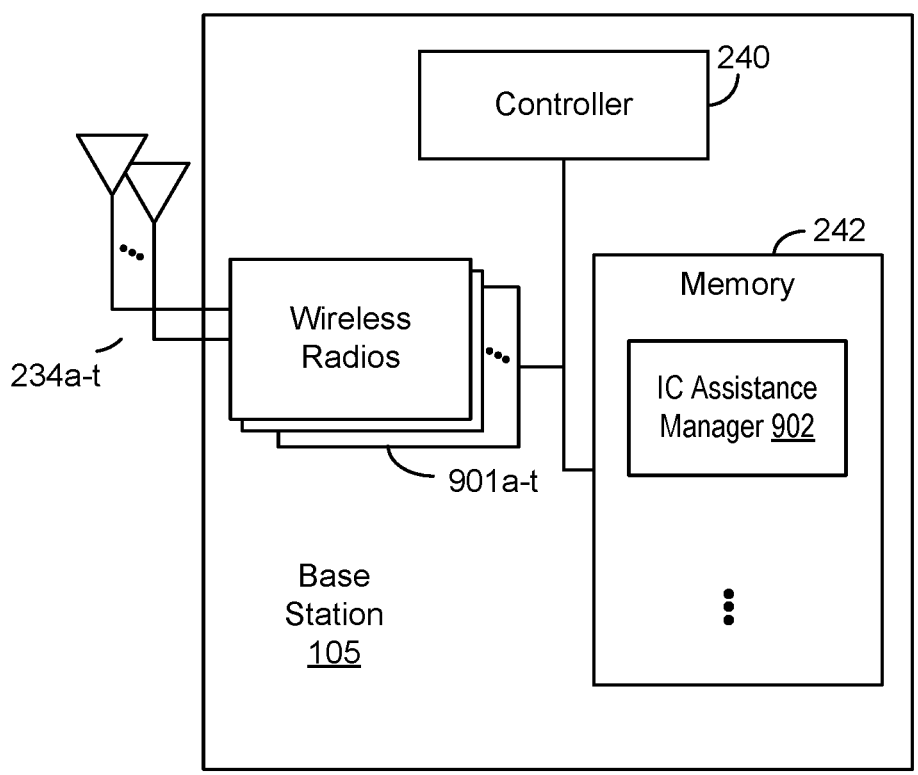
FIG. 9 is a block diagram of an example base station that supports mechanisms for signaling non-linearities to a victim UE for interference cancellation in a wireless communication system according to one or more aspects.

FIG. 7 is a block diagram illustrating an example process 700 that supports mechanisms for signaling non-linearities to a victim UE for interference cancellation in a wireless communication system according to one or more aspects. Operations of process 700 may be performed by a base station, such as base station 105 described above with reference to FIGS. 1-4, or described with reference to FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901a-t and antennas 234a-t. Wireless radios 901a-t includes various components and hardware, as illustrated in FIG. 2 for base station 105, including modulator/demodulators 232a-t, MIMO detector 236, receive processor 238, transmit processor 220, and TX MIMO processor 230.

At block 702 of process 700, a base station (e.g., base station 105) receives an uplink transmission from an aggressor UE (e.g., aggressor UE 115b) over an uplink at a transmit power. In aspects, the uplink transmission causes an interference signal to be received by a victim UE (e.g., victim UE 115a). In order to implement the functionality for such operations, the base station, under control of controller/processor 240, receives an uplink transmission from an aggressor UE over an uplink at a transmit power via wireless radios 901a-t and antennas 234a-t. In aspects, base station 105 may perform operations to receive an uplink transmission from an aggressor UE over an uplink at a transmit power according to operations and functionality as described above with reference to base station 105 and as illustrated in FIGS. 3 and 4.

At block 704 of process 700, base station 105 receives an indication of a power amplifier model associated with the aggressor UE (e.g., aggressor UE 115b). In aspects, the victim UE is configured to perform interference cancellation on the interference signal based, at least in part, on the power amplifier model associated with the aggressor UE and the transmit power used by the aggressor UE to transmit the uplink transmission to base station 105. In order to implement the functionality for such operations, the base station, under control of controller/processor 240, receives the indication of a power amplifier model associated with the aggressor UE via wireless radios 901a-t and antennas 234a-t. In aspects, base station 105 may perform operations to receive the indication of a power amplifier model associated with the aggressor UE according to operations and functionality as described above with reference to base station 105 and as illustrated in FIGS. 3 and 4.

In one or more aspects, techniques for supporting mechanisms for signaling non-linearities to a victim UE for interference cancellation in a wireless communication system according to one or more aspects may include additional aspects, such as any single aspect or any combination of aspects described below or in connection with one or more other processes or devices described elsewhere herein. In a first aspect, supporting signaling non-linearities to a victim UE for interference cancellation in a wireless communication system may include an apparatus configured to obtain a power amplifier model associated with an aggressor UE transmitting an uplink transmission to a base station over an uplink. In this aspect, the uplink transmission causes an interference signal to be received by the UE. The apparatus is further configured to determine an estimate of a transmit power used by the aggressor UE to transmit the uplink transmission to the base station, and to perform interference cancellation on the interference signal based, at least in part, on the power amplifier model associated with the aggressor UE and the transmit power used by the aggressor UE to transmit the uplink transmission. Additionally, the apparatus may perform or operate according to one or more aspects as described below. In some implementations, the apparatus includes a wireless device, such as a UE (e.g., a victim UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the power amplifier model includes a non-linearity model of a power amplifier associated with the power amplifier model.

In a third aspect, alone or in combination with one or more of the first aspect or the second aspect, obtaining the power amplifier model associated with the aggressor UE includes receiving an indication of a configuration of a reference signal transmitted by the aggressor UE.

In a fourth aspect, alone or in combination with the third aspect, obtaining the power amplifier model associated with the aggressor UE includes extracting the power amplifier model based on the configuration of the reference signal.

In a fifth aspect, alone or in combination with one or more of the first aspect through the fourth aspect, the reference signal is a UL-RS transmitted from the aggressor UE to the base station.

In a sixth aspect, alone or in combination with one or more of the first aspect through the fifth aspect, receiving the indication of the configuration of the UL-RS includes receiving the indication of the configuration of the UL-RS in a configuration message from the base station.

In a seventh aspect, alone or in combination with the sixth aspect, the configuration message includes sequence information associated with the UL-RS, the sequence information including time and frequency information, and/or an indication of a type of the reference signal, wherein the type includes a DMRS type and/or an SRS type.

In an eighth aspect, alone or in combination with one or more of the first aspect through the seventh aspect, the configuration message includes a new DCI message format, and/or an RRC message.

In a ninth aspect, alone or in combination with one or more of the first aspect through the eighth aspect, receiving the indication of the configuration of the UL-RS includes receiving the indication of the configuration of the UL-RS in a sidelink message from the aggressor UE.

In a tenth aspect, alone or in combination with one or more of the first aspect through the ninth aspect, the reference signal transmitted by the aggressor UE is a sidelink reference signal transmitted from the aggressor UE to the UE over a sidelink.

In an eleventh aspect, alone or in combination with one or more of the first aspect through the tenth aspect, the indication of the power amplifier model is received from the base station and/or from the aggressor UE via a sidelink between the UE and the aggressor UE.

In a twelfth aspect, alone or in combination with the eleventh aspect, the base station is configured to receive the power amplifier model from the aggressor UE.

In a thirteenth aspect, alone or in combination with one or more of the first aspect through the twelfth aspect, the indication of the power amplifier model includes one or more coefficients defining the power amplifier model.

In a fourteenth aspect, alone or in combination with the thirteenth aspect, the coefficients correspond to the transmit power used by the aggressor UE to transmit the uplink transmission to the base station, and/or different values of transmit powers.

In a fifteenth aspect, alone or in combination with one or more of the first aspect through the fourteenth aspect, determining the estimate of the transmit power used by the aggressor UE to transmit the uplink transmission to the base station includes receiving an indication of the transmit power from the base station in a DCI message, an RRC message, and/or a MAC-CE, receiving the indication of the transmit power from the aggressor UE in a sidelink message, and/or estimating the transmit power used by the aggressor UE to transmit the uplink transmission to the base station.

In a sixteenth aspect, techniques for supporting mechanisms for signaling non-linearities to a victim UE for interference cancellation in a wireless communication system may include an apparatus configured to transmit an uplink transmission to a base station over an uplink using a transmit power. In this aspect, the uplink transmission causes an interference signal to be received by a victim UE. The apparatus is further configured to determine a power amplifier model associated with the UE, and to transmit an indication of the power amplifier model associated with the UE to the victim UE. In this aspect, the victim UE is configured to perform interference cancellation on the interference signal based, at least in part, on the power amplifier model associated with the UE and the transmit power used by the UE to transmit the uplink transmission to the base station. Additionally, the apparatus may perform or operate according to one or more aspects as described below. In some implementations, the apparatus includes a wireless device, such as a UE (e.g., an aggressor UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a seventeenth aspect, alone or in combination with one or more of the sixteenth aspect through the sixteenth aspect, the power amplifier model includes a non-linearity model of a power amplifier of the UE associated with the power amplifier model.

In an eighteenth aspect, alone or in combination with one or more of the sixteenth aspect through the seventeenth aspect, the techniques of the sixteenth aspect include transmitting an indication of a configuration of a reference signal transmitted by the UE.

In a nineteenth aspect, alone or in combination with the eighteenth aspect, the victim UE is configured to extract the power amplifier model based on the configuration of the reference signal.

In a twentieth aspect, alone or in combination with one or more of the sixteenth aspect through the nineteenth aspect, the reference signal is a UL-RS transmitted from the UE to the base station.

In a twenty-first aspect, alone or in combination with one or more of the sixteenth aspect through the twentieth aspect, the indication of the configuration of the reference signal includes sequence information associated with the UL-RS, the sequence information including time and frequency information, and/or an indication of a type of the reference signal.

In a twenty-second aspect, alone or in combination with the twenty-first aspect, the type includes a DMRS type and/or an SRS type.

In a twenty-third aspect, alone or in combination with one or more of the sixteenth aspect through the twenty-second aspect, transmitting the indication of the configuration of the UL-RS includes transmitting the indication of the configuration of the UL-RS to the victim UE in a sidelink message.

In a twenty-fourth aspect, alone or in combination with one or more of the sixteenth aspect through the twenty-third aspect, the reference signal is a sidelink reference signal transmitted from the UE to the victim UE over a sidelink.

In a twenty-fifth aspect, alone or in combination with one or more of the sixteenth aspect through the twenty-fourth aspect, transmitting the indication of the power amplifier model associated with the UE to the victim UE includes transmitting the indication of the power amplifier model to the base station, and/or transmitting the indication of the power amplifier model to the victim UE via a sidelink between the UE and the victim UE.

In a twenty-sixth aspect, alone or in combination with the twenty-fifth aspect, the base station is configured to transmit the power amplifier model to the victim UE.

In a twenty-seventh aspect, alone or in combination with one or more of the sixteenth aspect through the twenty-sixth aspect, the indication of the power amplifier model includes one or more coefficients defining the power amplifier model.

In a twenty-eighth aspect, alone or in combination with the twenty-seventh aspect, the coefficients correspond to the transmit power used by the UE to transmit the uplink transmission to the base station, and/or different values of transmit powers.

In a twenty-ninth aspect, alone or in combination with one or more of the sixteenth aspect through the twenty-eighth aspect, the techniques of the sixteenth aspect include transmitting, to the victim UE via a sidelink message, an indication of the transmit power used by the UE to transmit the uplink transmission to the base station.

In a thirtieth aspect, techniques for supporting mechanisms for signaling non-linearities to a victim UE for interference cancellation in a wireless communication system may include an apparatus configured to receive an uplink transmission from an aggressor UE over an uplink at a transmit power. In this aspect, the uplink transmission causes an interference signal to be received by a victim UE. The apparatus is further configured to receive an indication of a power amplifier model associated with the aggressor UE. In this aspect, the victim UE is configured to perform interference cancellation on the interference signal based, at least in part, on the power amplifier model associated with the aggressor UE and the transmit power used by the aggressor UE to transmit the uplink transmission to the base station. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-first aspect, alone or in combination with one or more of the thirtieth aspect through the thirtieth aspect, the power amplifier model includes a non-linearity model of a power amplifier of the aggressor UE associated with the power amplifier model.

In a thirty-second aspect, alone or in combination with one or more of the thirtieth aspect through the thirty-first aspect, the indication of the power amplifier model associated with the aggressor UE includes a UL-RS transmitted from the aggressor UE to the base station.

In a thirty-third aspect, alone or in combination with one or more of the thirtieth aspect through the thirty-second aspect, transmitting, to the victim UE, an indication of a configuration of the UL-RS.

In a thirty-fourth aspect, alone or in combination with the thirty-third aspect, the indication of the configuration of the UL-RS includes sequence information associated with the UL-RS, the sequence information including time and frequency information, and/or an indication of a type of the reference signal.

In a thirty-fifth aspect, alone or in combination with one or more of the thirty-third aspect through the thirty-fourth aspect, the type includes a DMRS type and/or an SRS type.

In a thirty-sixth aspect, alone or in combination with one or more of the thirtieth aspect through the thirty-fifth aspect, the indication of the configuration of the UL-RS includes a new DCI message format, and/or an RRC message.

In a thirty-seventh aspect, alone or in combination with one or more of the thirtieth aspect through the thirty-sixth aspect, the techniques of the thirtieth aspect include transmitting the indication of the power amplifier model associated with the aggressor UE to the victim UE.

In a thirty-eighth aspect, alone or in combination with one or more of the thirtieth aspect through the thirty-seventh aspect, the indication of the power amplifier model includes one or more coefficients defining the power amplifier model.

In a thirty-ninth aspect, alone or in combination with the thirty-eighth aspect, the coefficients correspond to the transmit power used by the aggressor UE to transmit the uplink transmission to the base station, and/or different values of transmit powers.

In a fortieth aspect, alone or in combination with one or more of the thirtieth aspect through the thirty-ninth aspect, the techniques of the thirtieth aspect include transmitting, to the victim UE, an indication of the transmit power used by the aggressor UE to transmit the uplink transmission to the base station in a DCI message, an RRC message, and/or a MAC-CE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   obtaining a power amplifier model associated with an aggressor UE that transmits an uplink transmission to a base station over an uplink, wherein the uplink transmission causes an interference signal to be received by the UE, wherein obtaining the power amplifier model includes receiving an indication of the power amplifier model, and wherein:
      the indication of the power amplifier model includes one or more coefficients defining the power amplifier model, and
      the one or more coefficients correspond to a transmit power used by the aggressor UE to transmit the uplink transmission to the base station or different values of the transmit power used by the aggressor UE to transmit the uplink transmission to the base station; and
   performing interference cancellation on the interference signal based, at least in part, on the power amplifier model associated with the aggressor UE and the transmit power used by the aggressor UE to transmit the uplink transmission.

2. The method of claim 1, wherein the power amplifier model includes a non-linearity model of a power amplifier associated with the power amplifier model.

3. The method of claim 1, wherein obtaining the power amplifier model associated with the aggressor UE further comprises:
   receiving an indication of a configuration of a reference signal transmitted by the aggressor UE; and
   extracting the power amplifier model based on the configuration of the reference signal.

4. The method of claim 3, wherein the reference signal is an uplink reference signal (UL-RS) transmitted from the aggressor UE to the base station.

5. The method of claim 4, wherein receiving the indication of the configuration of the UL-RS includes receiving the indication of the configuration of the UL-RS in a configuration message from the base station, wherein the configuration message includes
   an indication of a type of the reference signal, wherein the type includes a sounding reference signal (SRS) type.

6. The method of claim 5, wherein the configuration message includes one or more of:
   a new downlink control information (DCI) message format; or
   a radio resource control (RRC) message.

7. The method of claim 4, wherein receiving the indication of the configuration of the UL-RS includes receiving the indication of the configuration of the UL-RS in a sidelink message from the aggressor UE.

8. The method of claim 3, wherein the reference signal transmitted by the aggressor UE is a sidelink reference signal transmitted from the aggressor UE to the UE over a sidelink.

9. The method of claim 1, wherein the indication of the power amplifier model is received from one or more of:
   the base station, wherein the base station is configured to receive the power amplifier model from the aggressor UE; or
   the aggressor UE via a sidelink between the UE and the aggressor UE.

10. The method of claim 1, further comprising:
    determining an estimate of the transmit power used by the aggressor UE to transmit the uplink transmission to the base station, wherein determining the estimate of the transmit power used by the aggressor UE to transmit the uplink transmission to the base station includes
    receiving an indication of the transmit power from the base station in one or more of a downlink control information (DCI) message, a radio resource control (RRC) message, or a medium access control (MAC)-control element (CE);
    receiving the indication of the transmit power from the aggressor UE in a sidelink message; or
    estimating the transmit power used by the aggressor UE to transmit the uplink transmission to the base station.

11. The method of claim 1, wherein the one or more coefficients correspond to coefficients of a polynomial that approximates a non-linear behavior of a power amplifier of the aggressor UE.

12. The method of claim 1, further comprising:
    storing a table of different sets of the one or more coefficients, wherein each set of the one or more coefficients corresponds to a different transmit power used by the aggressor UE; and
    in response to receiving the indication of the power amplifier model, selecting a set of the one or more coefficients from the table, the set corresponding to the transmit power, wherein performing interference cancellation on the interference signal includes applying the set of the one or more coefficients to perform the interference cancellation.

13. The method of claim 1, wherein the power amplifier model includes a memory polynomial (MP) model corresponding to non-linearities associated with a power amplifier of the aggressor UE.

14. A method of wireless communication performed by a user equipment (UE), the method comprising:
    transmitting an uplink transmission to a base station over an uplink using a transmit power, wherein the uplink transmission causes an interference signal to be received by a victim UE; and
    transmitting an indication of a power amplifier model associated with the UE to the victim UE, wherein:
       the indication of the power amplifier model includes one or more coefficients defining the power amplifier model, and
       the one or more coefficients correspond to the transmit power used by the UE to transmit the uplink transmission to the base station or to different values of the transmit power used by the UE to transmit the uplink transmission to the base station; and the victim UE is configured to perform interference cancellation on the interference signal based, at least in part, on the power amplifier model associated with the UE and the transmit power used by the UE to transmit the uplink transmission to the base station.

15. The method of claim 14, wherein the power amplifier model includes a non-linearity model of a power amplifier of the UE associated with the power amplifier model.

16. The method of claim 14, further comprising:
transmitting an indication of a configuration of a reference signal transmitted by the UE, wherein the victim UE is configured to extract the power amplifier model based on the configuration of the reference signal.

17. The method of claim 16, wherein the reference signal is an uplink reference signal (UL-RS) transmitted from the UE to the base station, and wherein transmitting the indication of the configuration of the UL-RS includes transmitting the indication of the configuration of the UL-RS to the victim UE in a sidelink message.

18. The method of claim 17, wherein the indication of the configuration of the reference signal includes an indication of a type of the reference signal, wherein the type includes a sounding reference signal (SRS) type.

19. The method of claim 16, wherein the reference signal is a sidelink reference signal transmitted from the UE to the victim UE over a sidelink.

20. The method of claim 14, wherein transmitting the indication of the power amplifier model associated with the UE to the victim UE includes one or more of:
transmitting the indication of the power amplifier model to the base station, wherein the base station is configured to transmit the power amplifier model to the victim UE; or
transmitting the indication of the power amplifier model to the victim UE via a sidelink between the UE and the victim UE.

21. The method of claim 14, further comprising:
transmitting, to the victim UE via a sidelink message, an indication of the transmit power used by the UE to transmit the uplink transmission to the base station.

22. The method of claim 14, wherein the one or more coefficients correspond to a memory polynomial (MP) model of a polynomial that approximates non-linearities associated with a power amplifier of an aggressor UE.

23. A method of wireless communication performed by a base station, the method comprising:
receiving an uplink transmission from an aggressor user equipment (UE) over an uplink at a transmit power, wherein the uplink transmission causes an interference signal to be received by a victim UE;
receiving an indication of a power amplifier model associated with the aggressor UE, wherein:
the indication of the power amplifier model includes one or more coefficients defining the power amplifier model, and
the one or more coefficients correspond to the transmit power used by the aggressor UE to transmit the uplink transmission to the base station or to different values of the transmit power used by the aggressor UE to transmit the uplink transmission to the base station; and
the victim UE is configured to perform interference cancellation on the interference signal based, at least in part, on the power amplifier model associated with the aggressor UE and the transmit power used by the aggressor UE to transmit the uplink transmission to the base station.

24. The method of claim 23, wherein the power amplifier model includes a non-linearity model of a power amplifier of the aggressor UE associated with the power amplifier model.

25. The method of claim 23, wherein the indication of the power amplifier model associated with the aggressor UE includes an uplink reference signal (UL-RS) transmitted from the aggressor UE to the base station.

26. The method of claim 25, further comprising:
transmitting, to the victim UE, an indication of a configuration of the UL-RS, wherein the indication of the configuration of the UL-RS includes an indication of a type of the reference signal, wherein the type includes a sounding reference signal (SRS) type.

27. The method of claim 26, wherein the indication of the configuration of the UL-RS includes one or more of:
a new downlink control information (DCI) message format; or
a radio resource control (RRC) message.

28. The method of claim 23, further comprising:
transmitting the indication of the power amplifier model associated with the aggressor UE to the victim UE.

29. The method of claim 23, further comprising:
transmitting, to the victim UE, an indication of the transmit power used by the aggressor UE to transmit the uplink transmission to the base station in one or more of a downlink control information (DCI) message, a radio resource control (RRC) message, or a medium access control (MAC)-control element (CE).

30. The method of claim 23, wherein the one or more coefficients corresponding to a polynomial that approximates non-linearities associated with a power amplifier of the aggressor UE.

* * * * *